Patented Nov. 14, 1933

1,935,165

UNITED STATES PATENT OFFICE 1,935,165

PROCESS FOR TREATING RUBBER ARTICLES AND PRODUCT

William A. Steinle, Detroit, Mich., assignor to Morgan & Wright, Detroit, Mich., a corporation of Michigan No Drawing. Application January 2, 1931
Serial No. 506,314

6 Claims. (Cl. 18—58)

This invention relates to the production of strong and impervious rubber materials such as automobile inner tubes and contemplates a new and improved process for making such materials.

In the manufacture of rubber articles such as inflatable bodies, from latex or artificial dispersions of rubber, it has been found that the finished product although stronger than tubes manufactured by other processes, sometimes possesses the objectionable feature of having small almost infinitesimal pin holes therein through which, when the article is inflated, the gaseous inflating medium slowly leaks, thereby reducing the efficiency of the article in accomplishing the purpose for which it was designed and constructed. Under constant conditions of temperature and dryness, this slight porosity increases with the age of the inflatable body. Moreover, after storage of such articles for any considerable period of time, it has been found that the rubber has lost some of its original flexibility and softness and has become slightly dry and hard and thereby lost some of its resistance to tearing. These disadvantages have been overcome by the present invention which makes it possible to manufacture a rubber article of great strength which is less porous and more resistant to leaks than articles of the same character heretofore known and which possesses greater and more permanent resistance to tear. The new product is capable of being stored for substantial periods of time without apparent drying or hardening and without loss of its power to resist tearing action.

The invention comprises generically the incorporation of a hygroscopic softening agent into the rubber stock in order to insure the absorption and permanent retention therein of a small percentage of moisture. Although I do not know the precise principle which explains the present invention, I believe that the hygroscopic material, having a tendency to repel rubber and not to mix therewith, bleeds to the surface of the coagulated and cured film where it remains by the concurrent action of the polar attraction of one end of each molecule to the rubber mass and the capillary attraction exerted by the hygroscopic liquid in the minute pores of interstices of the rubber. The hygroscopic material, having the capacity to maintain a uniform moisture content insures the presence of moisture throughout the rubber mass and renders it softer and better able to resist tearing and to resist the passage of gases therethrough.

The invention is typified by the following example which is chosen for illustrative purposes merely:

A suitable mandrel, for instance in the general shape of an inner tube for automobile tires, is dipped into a latex composition for a period of time sufficient for the required thickness of deposit to form, after which it is dried for a few minutes and immersed again in a glycerine bath. The mandrel is withdrawn and the film dried and cured and subsequently processed in the usual manner for formation into an inner tube. It should be noted that the rubber material may be an artificial dispersion of rubber instead of latex and that a differential in pressure may, and in practice I have found this to be preferable, be employed both during the latex dipping and glycerine dipping operations. Instead of glycerine, other hygroscopic materials may be used such as ethylene glycol, ethanol amines, and natural or sulphonated castor oils. If desired, the hygroscopic material may be added to the rubber dispersion itself and its incorporation in the deposited film thus effectuated by dipping therein, but I have found it commercially expedient to dip a form into a dispersion and then subject it to the action of the hygroscopic agent. Repeated and alternate dippings may be made as desired.

As a specific example of the procedure including the principles of this invention, the following is illustrative:

A latex compound was obtained in accordance with the following formula:

| | Parts |
|---|---|
| Rubber (as latex) | 100 |
| Zinc oxide | 5 |
| Whiting | 10 |
| Spindle oil | 10 |
| Sulphur | 3.25 |
| Paraffin | .5 |
| Heptene base | .125 |
| Glue | 1.5 |
| Ammonia | .86 |
| Sodium polysulphide 50% solution | 7.50 |

Into the latex compound above set out a porous form was dipped for 5 minutes, under a differential pressure, or until a deposit is formed which will have a cured gauge of approximately .060. The form was removed and allowed to stand under vacuum for 5 minutes. It was then dipped into a 50% solution of glycerine and water for one minute, after which it was removed and allowed to dry while still under vacuum for about an hour at room temperature. The vacuum was then broken and the tube was dried at 170° F. for 50 minutes and then cured for 65 minutes at 260° F. in steam at atmospheric pressure.

I have found the following advantageous changes in the properties of rubber inner tube stock have resulted by the practice of this invention. An inner tube made by present methods was compared with one made simultaneously by the method included in this invention, and after a specified period the tear strength and porosity of each tube stock was measured:

| Resistance to tear of stock treated in regular manner (pounds) | Resistance to tear after treatment in accordance with invention (pounds) | Percent increase in strength as shown by tear resistance |
|---|---|---|
| 24.8 | 41.8 | 68 percent |
| Porosity or air leak of stock treated in regular manner (loss of pressure in pounds per week) | Porosity or air leak of stock after treatment with this invention (loss in pressure in pounds per week) | Percent decrease in porosity or air leak |
| 3.78 | 3.02 | 20 percent |

The porosity test indicates the average loss in pounds for each week, the tires having been pumped to a specified pressure at the end of each week.

In the material produced by the use of the process of this invention the glycerine absorbed may be from 5 to 12% depending on the conditions of treatment.

The illustrative example is to be considered as such and does not limit the scope of the present invention which obviously may be applied to the production of other articles than automobile inner tubes.

In addition to the materials mentioned herein, I contemplate the addition of other kinds of compounding ingredients in a deposited rubber film in the manner herein set forth.

Having thus described my invention, what I claim and desire to protect by Letters Patent is:

1. A process for increasing the gas impermeability and tear resistance of rubber deposited directly from aqueous dispersions which comprises diffusing a fluid hygroscopic material into the deposited rubber under differential pressure, and permanently retaining said material in the rubber.

2. A process for increasing the gas impermeability and tear resistance of rubber deposited directly from aqueous dispersions which comprises diffusing into the deposited rubber under differential pressure a fluid hygroscopic material selected from the group consisting of glycerin, ethylene glycols, ethanol amines, and natural or sulphonated non-drying oils, and permanently retaining said material in the rubber.

3. A process for increasing the gas impermeability and tear resistance of rubber deposited directly from aqueous dispersions which comprises diffusing into the deposited rubber under differential pressure a fluid hygroscopic material comprising at least two methylene groups each attached to hydroxyl, and permanently retaining said material in the rubber.

4. A process for increasing the gas impermeability and tear resistance of rubber deposited directly from aqueous dispersions which comprises diffusing glycerin into the deposited rubber under differential pressure, and permanently retaining said glycerin in the rubber.

5. A process for increasing the gas impermeability and tear resistance of rubber deposited directly from aqueous dispersions which comprises forming a deposit of solids from an aqueous dispersion of rubber, superficially drying the deposit, diffusing a fluid hygroscopic agent into the deposit, and permanently retaining it therein, drying and vulcanizing.

6. A process for increasing the gas impermeability and tear resistance of rubber deposited directly from aqueous dispersions which comprises forming a deposit of solids from an aqueous dispersion of rubber, superficially drying the deposit, treating the deposit under differential pressure with a solution of glycerin and permanently retaining the glycerin in the deposit, drying, and vulcanizing.

WILLIAM A. STEINLE.